May 24, 1927.
E. T. NORBECK
1,630,208
WINDOW ATTACHMENT FOR WINDSHIELDS
Filed June 10, 1925
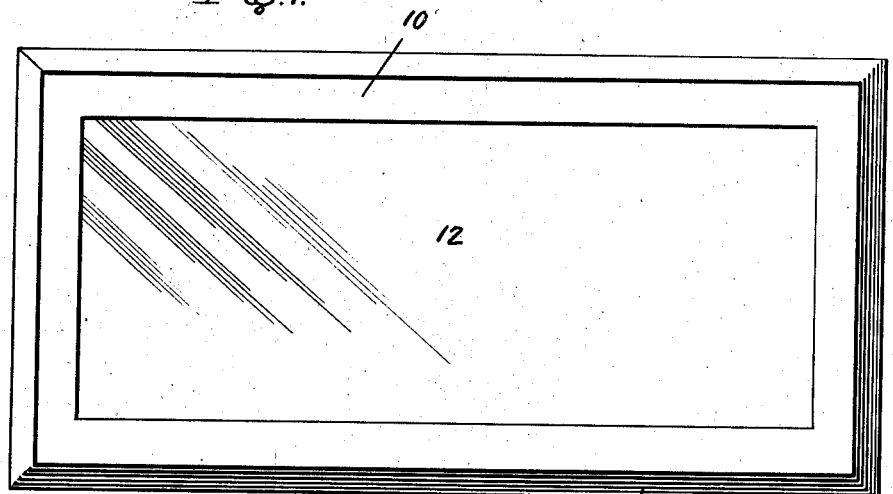
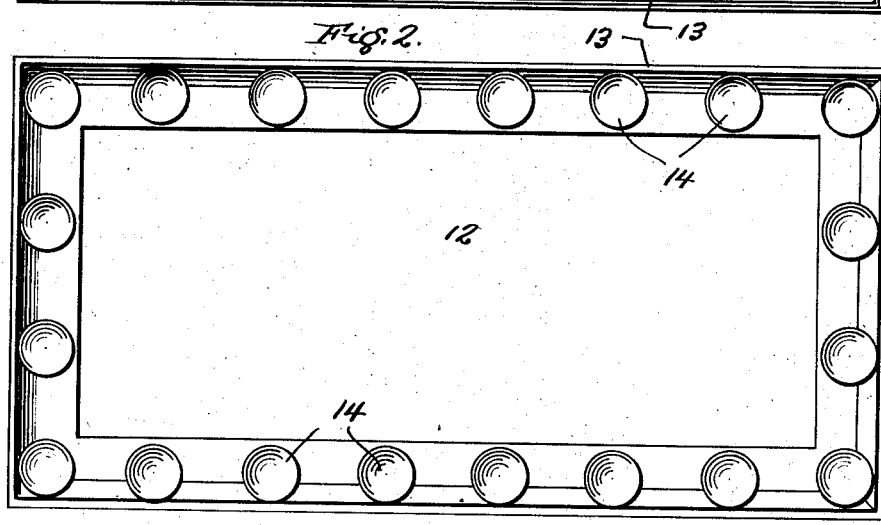
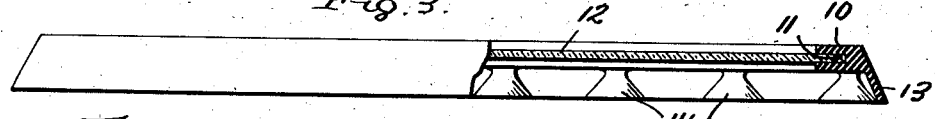
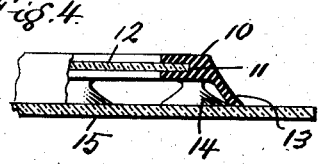
Emil T. Norbeck
INVENTOR
BY Victor J. Evans
ATTORNEY
WITNESS: Gerald Hemmey Patented May 24, 1927.

1,630,208

UNITED STATES PATENT OFFICE.

EMIL THEODORE NORBECK, OF MINNEAPOLIS, MINNESOTA.

WINDOW ATTACHMENT FOR WINDSHIELDS.

Application filed June 10, 1925. Serial No. 36,162.

This invention relates to improvements in frames which are preferably constructed of some resilient substance in the form of rubber or some other elastic substance and which is adapted to have a plate of glass or celluloid secured to its inner side edges and when the frame per se is placed upon the inner side of an automobile wind-shield and the like will form an air tight space between the inner side of the wind-shield and the corresponding side of the glass or celluloid included in the frame in order that the wind-shield glass of the vehicle will be prevented from frosting and give a clear vision to the driver.

Another object of my invention is the provision of beveled edges upon this frame which are adapted to engage the surface of the automobile wind-shield and which further includes upon the inner sides of the frame a plurality of suction cups which are adapted to engage the inner side of the wind-shield in order that the same may be readily and easily and rigidly secured to the wind-shield.

With the above and other objects in view, the invention further includes the following novel features and details of construction, to be hereinafter more fully described illustrated in the accompanying drawing and pointed out in the appended claim.

In the drawing:—

Figure 1 is front elevation of my invention.

Figure 2 is a rear elevation thereof.

Figure 3 is a fragmentary end elevation of my invention.

Figure 4 is a fragmentary end elevation of my invention showing the same applied to a portion of a wind-shield.

Referring to the drawing in detail, wherein like characters of reference denote corresponding parts, the reference character 10 indicates a frame which is preferably constructed of rubber and which forms a substantially oblong frame including recess portions 11 within the inner edges thereof and within which recessed portions 11 provided in the sides and ends thereof are the corresponding edges of a plate of glass or celluloid as indicated at 12. The outer side of the ends and sides forming the frame 10 include beveled strips 13 which extend an appreciable distance below the under sides of the frame, the purpose of which will be presently apparent.

Arranged at spaced intervals upon the inner sides of the side bars and end bars forming the frame 10 are a plurality of suction cups 14 which have their lower flared ends extending an appreciable distance below the lower edges of the strips.

In the mode of operation of the present invention it will be clearly apparent that after the plate glass or celluloid 12 forming the window for the frame 10 is thus inserted within the groove 11 provided upon its inner sides and the suction cups 14 are moistened and compressed upon the inner sides of the wind-shield 15 as clearly illustrated in Figure 4 of the drawing, will be securely adhered and supported thereon while the lower edges of the strip 13 will be bent outwardly and also tend to create a form of vacuum between the outer side of the glass panel or celluloid strip 12 and the corresponding inner side of the wind-shield 15 in order that the usual frosting of the wind-shield 15 will be eliminated and the driver of the motor vehicle will at all times have a clear vision.

The invention is susceptible of various changes in its form, proportions and minor details of construction, and the right is herein reserved to make such changes as properly fall within the scope of the appended claim.

Having described my invention what is claimed is:

A window attachment for use upon automobile windshields comprising a rectangular resilient frame having a groove provided within its inner edges, a transparent plate having its edges received within the groove, a beveled strip extending obliquely from the outer edge of the frame and a plurality of suction cups secured to one side of the frame and adapted to engage the inner side of the windshield in order that the frame may be rigidly supported thereon whereby an air tight space will be defined therebetween, eliminating the usual frosting and assuring a clear vision therethrough.

In testimony whereof I affix my signature.

EMIL THEODORE NORBECK.